United States Patent
Mieno et al.

(10) Patent No.: US 7,522,525 B2
(45) Date of Patent: Apr. 21, 2009

(54) L2 SWITCH

(75) Inventors: Hironori Mieno, Kawasaki (JP); Youichi Konuma, Kawasaki (JP); Jyunichi Shimada, Kawasaki (JP); Koichi Saiki, Kawasaki (JP); Takashi Okuda, Kawasaki (JP); Takanori Sasaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 603 days.

(21) Appl. No.: 11/077,303

(22) Filed: Mar. 10, 2005

(65) Prior Publication Data
US 2005/0163132 A1  Jul. 28, 2005

Related U.S. Application Data

(63) Continuation of application No. PCT/JP02/11313, filed on Oct. 30, 2002.

(51) Int. Cl.
  *G01R 31/08* (2006.01)
  *H04L 12/28* (2006.01)
(52) U.S. Cl. .................... 370/235; 370/412
(58) Field of Classification Search .............. None
See application file for complete search history.

(56) References Cited

U.S. PATENT DOCUMENTS 6,085,238 A  7/2000  Yuasa et al.
6,618,381 B1 *  9/2003  Miyamoto et al. ..... 370/395.43
6,766,482 B1 *  7/2004  Yip et al. ............... 714/717
6,934,250 B1 *  8/2005  Kejriwal et al. ........ 370/229
7,093,027 B1 *  8/2006  Shabtay et al. ......... 709/239
7,123,583 B2 * 10/2006  Hoar et al. ............. 370/230
7,287,061 B2 * 10/2007  Tsubota ................. 709/207
2003/0086140 A1 *  5/2003  Thomas et al. ......... 359/167
2004/0260829 A1 * 12/2004  Husak et al. ........... 709/232
2005/0220059 A1 * 10/2005  DelRegno et al. ....... 370/337
2006/0045009 A1 *  3/2006  Madison et al. ........ 370/229

FOREIGN PATENT DOCUMENTS

| JP | 9-289521   | 11/1997 |
| JP | 10-098472  | 4/1998  |
| JP | 2001-053776 | 2/2001 |

OTHER PUBLICATIONS

IEEE 802.1Q (1998) pp. 26, 32-35, 67, 78, 184.*

* cited by examiner

*Primary Examiner*—Wing F Chan
*Assistant Examiner*—Eunsook Choi
(74) *Attorney, Agent, or Firm*—Katten Muchin Rosenman LLP

(57) ABSTRACT

In an L2 switch having a VLAN function for configuring a layer 2 network in a star topology, a mesh topology, a ring topology, or the like, a VLAN functional portion maps a frame to a predetermined VLAN, a frame classifying portion assigns to the frame a first tag indicating a priority, and a policing portion assigns to the frame a second tag indicating whether or not the frame can be discarded. Also, an OAM monitor inserts a monitoring frame to the VLAN.

24 Claims, 13 Drawing Sheets

L2 SWITCH

CROSS-REFERENCE TO RELATED APPLICATION

This application is a continuation of International Application PCT/JP02/11313 which was filed on Oct. 30, 2002, now pending, the contents of which are herein wholly incorporated by reference.

BACKGROUND OF THE INVENTION

1. Field of the Invention

The present invention relates to a layer 2 switch (hereinafter, referred to as L2 switch), and in particular to an L2 switch having a VLAN function for configuring a layer 2 network in a star topology, a mesh topology, a ring topology, or the like.

In recent years, as the speed of data communications is increased, demands for a layer 2-based service which is inexpensive and easy to control have been increasing. In the layer 2 service, reliability with assured bandwidth is important in the same way as in, for example, an SDH/SONET transmission apparatus, a WDM apparatus and an ATM apparatus applied in conventional leased line services.

2. Description of the Related Art

The specification of the Ethernet interface is generally a best-effort type. Therefore, in e.g. an Ethernet leased line service using a conventional L2 switch/bridge or a router including a bridge, a frame discard processing occurs unconditionally when a congestion occurs.

Accordingly, it has been required to assure a bandwidth where no congestion occurs in order to guarantee a bandwidth. Also, a link down transfer per user (VLAN) set on an L2 network could not be performed.

Thus, e.g. a layer 2-based Ethernet leased line service has been inadequate for implementation intended for a communication common carrier because the bandwidth could not be effectively utilized and the link down transfer could not be performed.

Therefore, the conventional Ethernet leased line service has been an expensive one composed of two types of platforms including a WDM apparatus, an SDH/SONET transmission apparatus or an ATM apparatus, capable of assuring a bandwidth and highly reliable but highly priced per apparatus, as a relaying apparatus; and an L2 switch/router as an Ethernet interface. Otherwise, the conventional Ethernet leased line service has been a service using a conventional L2 switch/router unable to effectively utilize the bandwidth and impossible to perform a link down transfer.

Moreover, an existing layer 2 switch/router has no function of transferring a link disconnection of an interexchange channel. Accordingly, in order to recognize the disconnection of the interexchange channel, a user himself or herself is required to always confirm the state of the channel by using e.g. a Hello packet or the like.

Namely, problems of e.g. the layer 2-based Ethernet leased line service are that the network is made expensive by using the SDH/SONET transmission apparatus, the ATM apparatus or the WDM apparatus, and that in the layer 2 service applied by the existing communication common carrier, it is unable to effectively utilize the bandwidth and impossible to perform the link down transfer per user (VLAN).

SUMMARY OF THE INVENTION

It is accordingly an object of the present invention to provide a bandwidth-guaranteed, inexpensive and highly reliable services for an L2 switch having a VLAN function for configuring a layer 2 network in a star topology, a mesh topology, a ring topology, or the like, and to provide services capable of performing a link down transfer.

In order to achieve the above-mentioned object, an ingress L2 switch according to the present invention comprises: a VLAN functional portion mapping a frame to a predetermined VLAN; a frame classifying portion assigning to the frame a first tag indicating a priority preset with respect to the frame; and a policing portion comparing a detected transmission rate of the frame with a preset transmission rate, and assigning to the frame a second tag indicating whether or not the frame can be discarded.

Namely, a VLAN functional portion maps a frame to a predetermined VLAN based on a preset rule. A frame classifying portion assigns a first tag (identifier) indicating a priority (class) preset with respect to the frame, thereby classifying the frame.

A policing portion detects a transmission rate of the frame, and compares the detected transmission rate with a preset transmission rate to assign a second tag (identifier) indicating whether or not the frame can be discarded.

Thus, it is made possible to classify a frame belonging to a specific VLAN based on its priority, and to indicate the frame that can be discarded, thereby enabling a frame to be transmitted at a bandwidth-guaranteed transmission rate.

In this case, the first and the second tag may be different from each other, so that the frame classifying portion and the policing portion need not be in a particular order.

It is to be noted that the VLAN is regarded as a path in the L2 switch of the present invention, so that the bandwidth guarantee is performed to the established path (VLAN) itself, or to the interior thereof.

Also, a user edge L2 switch which receives a frame from an end user is referred to as an ingress L2 switch, a user edge L2 switch which transmits a frame to an end user is referred to as an egress L2 switch, and an L2 switch between the ingress L2 switch and the egress L2 switch is referred to as a relaying L2 switch.

Also, in the present invention according to the above-mentioned invention, the VLAN functional portion may map the frame to the VLAN based on at least one of a port number, a MAC address, a protocol, and an IP subnet address.

Namely, the VLAN functional portion can map the frame to the VLAN by, for example, a port-oriented VLAN mapping, a MAC address-oriented VLAN mapping, a protocol-oriented VLAN mapping, or an IP subnet-oriented mapping. The mapping may be either one of e.g. implicit tagging and explicit tagging.

Also, in the present invention according to the above-mentioned invention, the VLAN functional portion may assign to the frame a VLAN tag identifying the mapped VLAN.

Namely, the VLAN functional portion can map the frame by the explicit tagging. It is to be noted that hereinafter the VLAN functional portion performing the explicit tagging will be occasionally referred to as a VLAN tag assigning portion.

Thus, a down stream element, a down stream functional portion or an L2 switch receiving the frame is made possible to explicitly identify the VLAN to which the frame belongs by using the third VLAN tag.

Also, in the present invention according to the above-mentioned invention, the priority may be set based on at least one of a MAC address included in the frame, a user VLAN identifier included in the frame, a ToS of the user VLAN, and a physical port to which the frame is inputted.

Namely, the frame classifying portion can determine the priority based on at least one of a MAC address included in the frame, a user VLAN included in the frame, a ToS (Type of Service) of the user VLAN, and the physical port having inputted the frame.

For example, the frame classifying portion can classify the frame into e.g. 3 classes (priorities 1-3).

Thus, the frame belonging to a predetermined VLAN can be classified into a plurality of classes. For example, it is made possible to set the bandwidth to be guaranteed per class.

Also, in the present invention according to the above-mentioned invention, the preset transmission rate may be set per at least one of the priority, the VLAN, and the physical port to which the frame is inputted.

Also, in the present invention according to the above-mentioned invention, the policing portion may classify the frame into a discarding frame, a discardable frame, and a nondiscardable frame, and may discard the discarding frame irrespective of the second tag.

Thus, the discarding frame can be immediately discarded regardless of the second tag, and it is made possible to determine whether or not a received frame can be discarded at a downstream part.

Also, in the present invention according to the above-mentioned invention, the VLAN functional portion may map the frame to a VLAN per trunk.

Namely, the VLAN functional portion can map the VLAN per trunk as in e.g. a link aggregation.

Thus, the VLAN of a transmission rate equal to or more than a transmission rate of a single physical port can be set, for example, by bundling a plurality of physical ports.

Also, the present invention according to the above-mentioned invention, may further comprise an OAM monitor inserting a monitoring frame into the VLAN. Thus, monitoring per VLAN is made possible.

Also, the present invention according to the above-mentioned invention, may further comprise: a switch fabric switching the frame based on the VLAN tag; and a shaper outputting the frame based on the priority indicated by the first tag and discarding the frame having congested based on the second tag. Thus, bandwidth guarantee of the frame is made possible.

Also, in the present invention according to the above-mentioned invention, the shaper may comprise: a plurality of queues, each of which corresponds to the priority and queues the frame based on the priority indicated by the first tag for each VLAN; a first scheduler taking out the queued frame based on the priority of the queue for each VLAN; and a second scheduler taking out the frame taken out by the first scheduler by a weighted round-robin method.

Also, in the present invention according to the above-mentioned invention, the shaper may comprise: M units of first queues, where M is a natural number, queuing frames with top M higher priorities based on the first tag; N units of second queues, where N is a natural number, queuing frames with lower priorities lower than the higher priorities based on the first tag for each VLAN; a first scheduler taking out the queued frame based on the priorities of the second queues for each VLAN; a second scheduler taking out the frame taken out by the first scheduler by a weighted round-robin method; and a third scheduler outputting the frames queued in the first queues in an order of the higher priorities in preference to the frame taken out by the second scheduler.

Also, in the present invention according to the above-mentioned invention, the shaper may comprise: a congested frame discarding portion discarding, based on the second tag, the frame having congested and queued in the queue.

Thus, when a congestion occurs, it is made possible to preferentially discard a discardable frame and to guarantee a bandwidth.

Also, the present invention according to the above-mentioned invention may further comprise a VLAN tag deleting portion deleting all of the tags assigned to the frame.

Also, in order to achieve the above-mentioned object, a relaying L2 switch comprises: a port receiving a frame; and a shaper discarding the frame having congested based on a tag indicating whether or not the frame is discardable.

Also, in the present invention according to the above-mentioned invention, the shaper, assuming the tag be made a second tag, may comprise: a first queue queuing the frame based on a first tag indicating a priority assigned to the frame for each VLAN, and corresponding to the priority; a first scheduler taking out the queued frame based on the priority of the queue for each VLAN; and a second scheduler taking out the frame taken out by the first scheduler by a weighted round-robin method.

Also, in the present invention according to the above-mentioned invention, the shaper, assuming the tag be made a second tag, may comprise: M units of first queues, where M is a natural number, queuing frames with top M higher priorities based on the first tag which indicates a priority added to the frame; N units of second queues, where N is a natural number, queuing frames with lower priorities lower than the higher priorities based on the first tag for each VLAN; a first scheduler taking out the queued frame based on the priorities of the second queues for each VLAN; a second scheduler taking out the frame taken out by the first scheduler by a weighted round-robin method; and a third scheduler outputting the frames queued in the first queues in an order of the higher priorities in preference to the frame selected by the second scheduler.

Also, in the present invention according to the above-mentioned invention, the shaper may comprise: a congested frame discarding portion discarding, based on the second tag, the frame having congested and queued in the queue.

Also, the present invention according to the above-mentioned invention may further comprise: a VLAN functional portion mapping a frame to a predetermined VLAN; a frame classifying portion, assuming the tag be made a second tag, assigning to the frame a first tag indicating a priority preset with respect to the frame; and a policing portion comparing a detected transmission rate of the frame with a preset transmission rate, and assigning to the frame the second tag indicating whether or not the frame can be discarded.

Also, the present invention according to the above-mentioned invention may further comprise: a VLAN tag assigning portion assigning a VLAN tag to the received frame; a frame classifying portion, assuming the tag be made a second tag, assigning to the frame a first tag indicating a priority preset with respect to the frame; and a policing portion comparing a detected transmission rate of the frame with a preset transmission rate, and assigning to the frame the second tag indicating whether or not the frame can be discarded; a switch fabric switching the frame; and a VLAN tag deleting portion deleting the tags assigned to the frame from the switch fabric.

Moreover, in order to achieve the above-mentioned object, an egress L2 switch according to the present invention comprises: a port receiving a frame; and a shaper discarding the frame having congested based on a tag indicating whether or not the frame is discardable.

Also, in the present invention according to the above-mentioned invention, the shaper, assuming the tag be made a second tag, may comprise: a first queue queuing the frame based on a first tag indicating a priority assigned to the frame for each VLAN, and corresponding to the priority; a first scheduler taking out the queued frame based on the priority of the queue for each VLAN; and a second scheduler taking out the frame taken out by the first scheduler by a weighted round-robin method.

Also, in the present invention according to the above-mentioned invention, the shaper, assuming the tag be made a second tag, may comprise: M units of first queues, where M is a natural number, queuing frames with top M higher priorities based on the first tag which indicates a priority added to the frame; N units of second queues, where N is a natural number, queuing frames with lower priorities lower than the higher priorities based on the first tag for each VLAN; a first scheduler taking out the queued frame based on the priorities of the second queues for each VLAN; a second scheduler taking out the frame taken out by the first scheduler by a weighted round-robin method; and a third scheduler outputting the frames queued in the first queues in an order of the higher priorities in preference to the frame selected by the second scheduler.

Also, in the present invention according to the above-mentioned invention, the shaper may comprise: a congested frame discarding portion discarding, based on the second tag, the frame having congested and queued in the queue.

Also, the present invention according to the above-mentioned invention may further comprise a VLAN tag deleting portion deleting a VLAN tag assigned to the frame.

Also, the present invention according to the above-mentioned invention may further comprise: a VLAN functional portion mapping a frame to a predetermined VLAN; a frame classifying portion, assuming the tag be made a second tag, assigning to the frame a first tag indicating a priority preset with respect to the frame; and a policing portion comparing a detected transmission rate of the frame with a preset transmission rate, and assigning to the frame the second tag indicating whether or not the frame can be discarded.

Also, the present invention according to the above-mentioned invention may further comprise: a VLAN tag assigning portion assigning a VLAN tag to the received frame; a frame classifying portion, assuming the tag be made a second tag, assigning to the frame a first tag indicating a priority preset with respect to the frame; and a policing portion comparing a detected transmission rate of the frame with a preset transmission rate, and assigning to the frame the second tag indicating whether or not the frame can be discarded; a switch fabric switching the frame; and a VLAN tag deleting portion deleting the tags assigned to the frame from the switch fabric.

Also, the present invention according to the above-mentioned invention, may further comprise an OAM monitor monitoring a VLAN maintenance operation per VLAN.

Also, the present invention according to the above-mentioned invention may further comprise a link down transferring portion performing a link disconnection transfer per VLAN when the OAM monitor detects a link disconnection.

Also, the present invention according to the above-mentioned invention may further comprise a valid/invalid setting portion setting whether or not the link down transferring portion performs the link disconnection transfer.

Thus, it is made possible to provide a leased line service utilizing a link down transfer and a leased line service not utilizing a link down transfer.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Embodiment of L2 Switch 100 on User Edge Side

Figure 1:
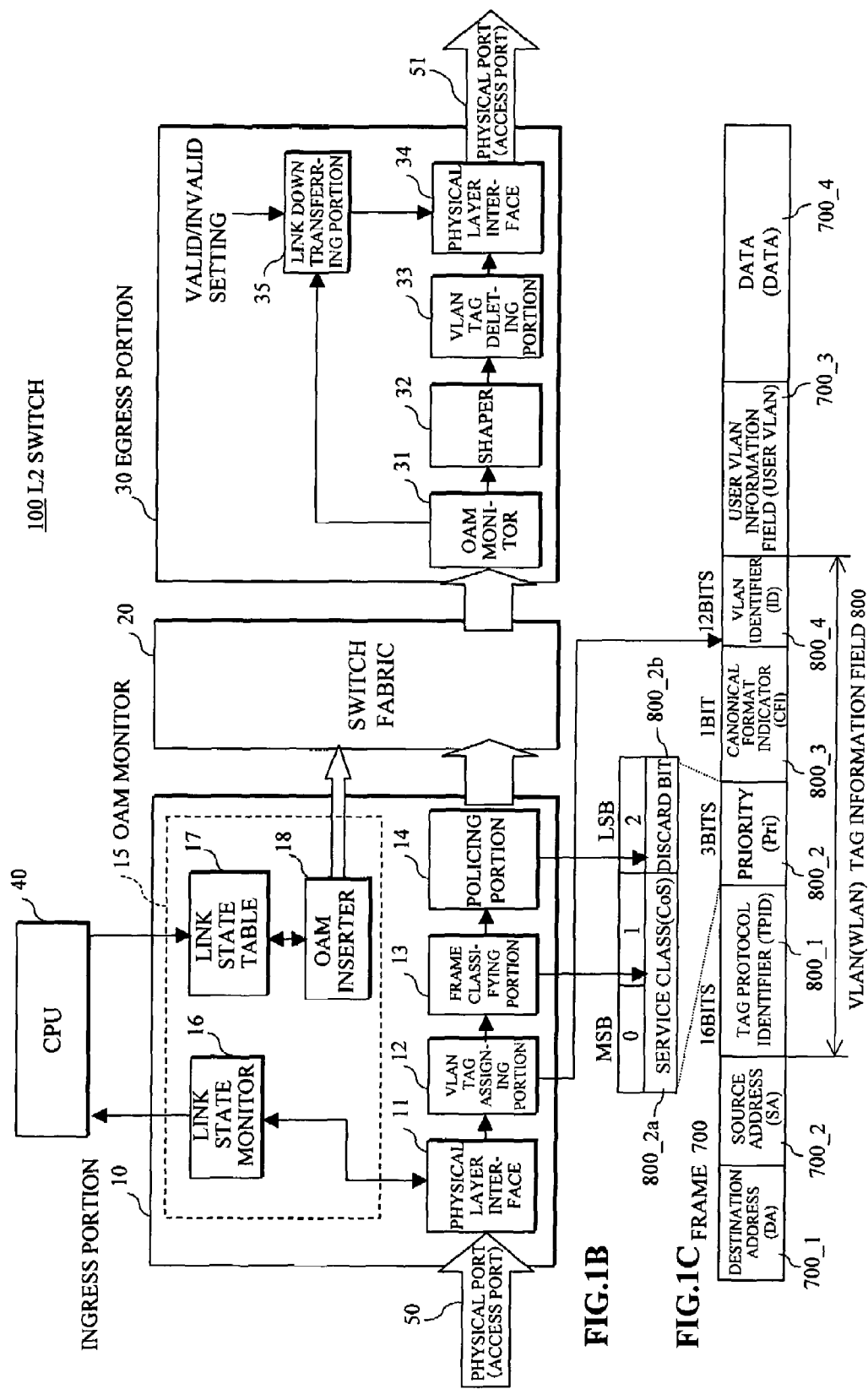
FIGS. 1A-1C are block diagrams showing an embodiment of an L2 switch, on a user edge side, according to the present invention.

FIGS. 1A-1C show an embodiment of an L2 switch 100 according to the present invention on a user edge side. Namely, this embodiment of the L2 switch 100 has a physical port (hereinafter, occasionally referred to as an access port) connected to a user terminal 200 or a network on an end user side through a link.

In FIG. 1A, the L2 switch 100 is composed of an ingress portion 10, a switch fabric 20, an egress portion 30, and a CPU 40.

The ingress portion 10 is composed of a physical port (access port) 50, a physical layer interface 11, a VLAN tag assigning portion 12, a frame classifying portion 13, a policing portion 14, and an OAM monitor 15. The OAM monitor 15 is composed of a link state monitor 16, a link state table 17, and an OAM inserter 18.

The egress portion 30 is composed of an OAM monitor 31, a shaper 32, a VLAN tag deleting portion 33, a physical layer interface 34, a link down transferring portion 35, and a physical port (access port) 51.

A frame inputted from the physical port 50 is provided to the switch fabric 20 through the physical layer interface 11, the VLAN tag assigning portion 12, the frame classifying portion 13, and the policing portion 14. The VLAN tag assigning portion 12 adds to the frame VLAN tag information including a VLAN tag corresponding to the frame, the frame classifying portion 13 classifies the frame to add thereto a tag indicating a service class, and the policing portion 14 adds to the frame a tag indicating whether or not the frame can be discarded.

FIG. 1C shows an arrangement of a frame 700 which is composed of a destination address 700_1, a source address 700_2, a VLAN (WLAN) tag information field 800, a user VLAN information field 700_3, and data 700_4.

The VLAN tag information field 800 is composed of a 16-bit tag protocol indicator 800_1, a 3-bit priority 800_2, a 1-bit canonical format indicator 800_3, and a 12-bit VLAN identifier 800_4. Among these, the VLAN identifier 800_4 is a VLAN tag corresponding to the frame 700.

FIG. 1B shows the priority 800_2 which is composed of a 2-bit service class 800_2a and a 1-bit discard bit 800_2b.

The service class 800_2a forms a tag indicating the service class (priority) which is added to the frame 700 by the frame classifying portion 13.

The discard bit 800_2b forms a tag indicating whether or not the frame can be discarded which is added to the frame 700 by the policing portion 14.

The switch fabric 20 switches the frame 700 provided from the policing portion 14 to be provided to the egress portion 30 based on the VLAN identifier 800_4. In the egress portion 30, the frame 700 is provided to the shaper 32 through the OAM monitor 31.

The shaper 32 preferentially reads the frame 700 with a high priority based on the service class 800_2a to be provided to the VLAN tag deleting portion 33, and deletes the frame 700 based on the discard bit 800_2b during a congestion.

The VLAN tag deleting portion 33 deletes the VLAN tag information field 800 from the frame 700 and transmits the frame having the field 800 deleted therefrom to a link on an access side through the physical layer interface 34 and the physical port 51.

Thus, the frame is transmitted within the VLAN to which the frame itself belongs.

Embodiment (1) of L2 Switch 100 on Network Side:
Use of Implicit Tag

Figure 2:
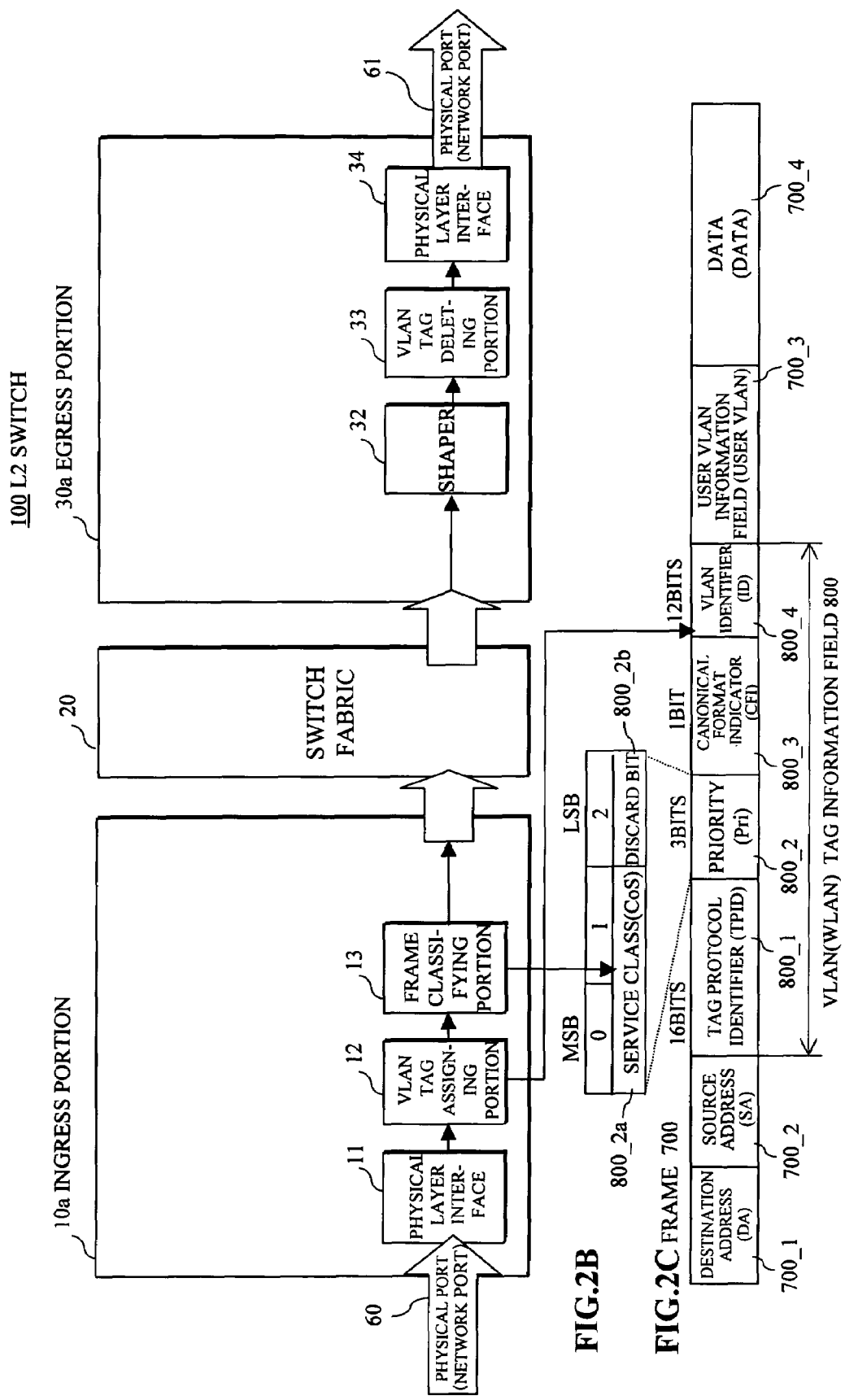
FIGS. 2A-2C are block diagrams showing an embodiment of an L2 switch, on a network side, according to the present invention.

FIG. 2A shows an embodiment (1) of the L2 switch 100 according to the present invention on a network side. Namely, this embodiment (1) of the L2 switch 100 has a physical port (hereinafter, occasionally referred to as a network port) connected to the L2 switch 100 of present invention through a link.

The L2 switch 100 on the network side is different from the L2 switch in the user edge shown in FIG. 1A in that the policing portion 14 and the OAM monitor 15 are not included in an ingress portion 10a, and that the OAM monitor 31 and the link down transferring portion 35 are not included in an egress portion 30a.

FIGS. 2C and 2B respectively show an arrangement of the frame 700 and the arrangement of a priority 800_2 included in the frame 700, which are respectively the same as FIGS. 1C and 1B.

In the embodiment (1), the L2 switch 100 receives a frame which has no VLAN tag information field 800 (see FIG. 2C) added thereto, i.e. a frame implicitly tagged with a MAC address, a protocol type, an upper-layer network identifier, a physical port, a user VLAN, a service type (ToS: Type of Service), etc.

In the ingress portion 10a, the VLAN tag assigning portion 12 assigns the VLAN tag information field 800 to the frame and sets the VLAN identifier 800_4. Furthermore, the frame classifying portion 13 sets the service class 800_2a.

The switch fabric 20 switches the frame 700 based on the VLAN identifier 800_4 included in the frame 700 to be provided to the egress portion 30a.

In the egress portion 30a, the shaper 32 preferentially reads out the frame 700 with a high priority based on the service class 800_2a to be provided to the VLAN tag deleting portion 33. The VLAN tag deleting portion 33 transmits the frame 700 having the VLAN tag information field 800 deleted therefrom to the link on the network side through the physical layer interface 34 and the physical port (network port) 61.

Thus, the frame is transmitted within the VLAN to which the frame itself belongs.

Also, since the tag is used only within the L2 switch 100 in the embodiment (1), the frame transmitted through the link does not include the VLAN tag information field 800. Therefore, the transmission capacity for the data 700_4 transmitted by the frame 700 can be made larger by the amount of the VLAN tag field 800 excluded therefrom.

Embodiment (2) of L2 Switch 100 on Network Side:
Use of Explicit Tag

An embodiment (2) of the L2 switch 100 on a network side will now be described referring to the same FIGS. 2A-2C showing the embodiment (1).

The L2 switch 100 of the embodiment (2) is different from that of the embodiment (1) in that the ingress portion 10a is not provided with the VLAN tag assigning portion 12 and the frame classifying portion 13, and that the egress portion 30a is not provided with the VLAN tag deleting portion 33.

The ingress portion 10a receives from the physical port (network port) 60 the frame 700 including the VLAN tag information field 800 shown in FIG. 2C.

In the ingress portion 10a, the frame 700 passes through the physical port 60 and the physical interface 11 as it is to be provided to the switch fabric 20. The switch fabric 20 switches the frame 700 based on the VLAN identifier 800_4 included in the frame 700 to be provided to the egress portion 30a.

In the egress portion 30a, the shaper 32 discards the frame 700 based on the discard bit 800_2b during a congestion, and preferentially reads out the frame 700 with a high priority based on the service class 800_2a to be transmitted to the link on the network side through the physical layer interface 34 and the physical port 61.

Thus, the frame 700 is transmitted within the corresponding VLAN.

Since the frame transmitted through the link includes the VLAN tag information field 800 in the embodiment (2), the capacity of the data 700_4 included in the frame is smaller by the amount of the VLAN tag information field 800 compared to the capacity of the data 700_4 in the embodiment (1).

Figure 3:
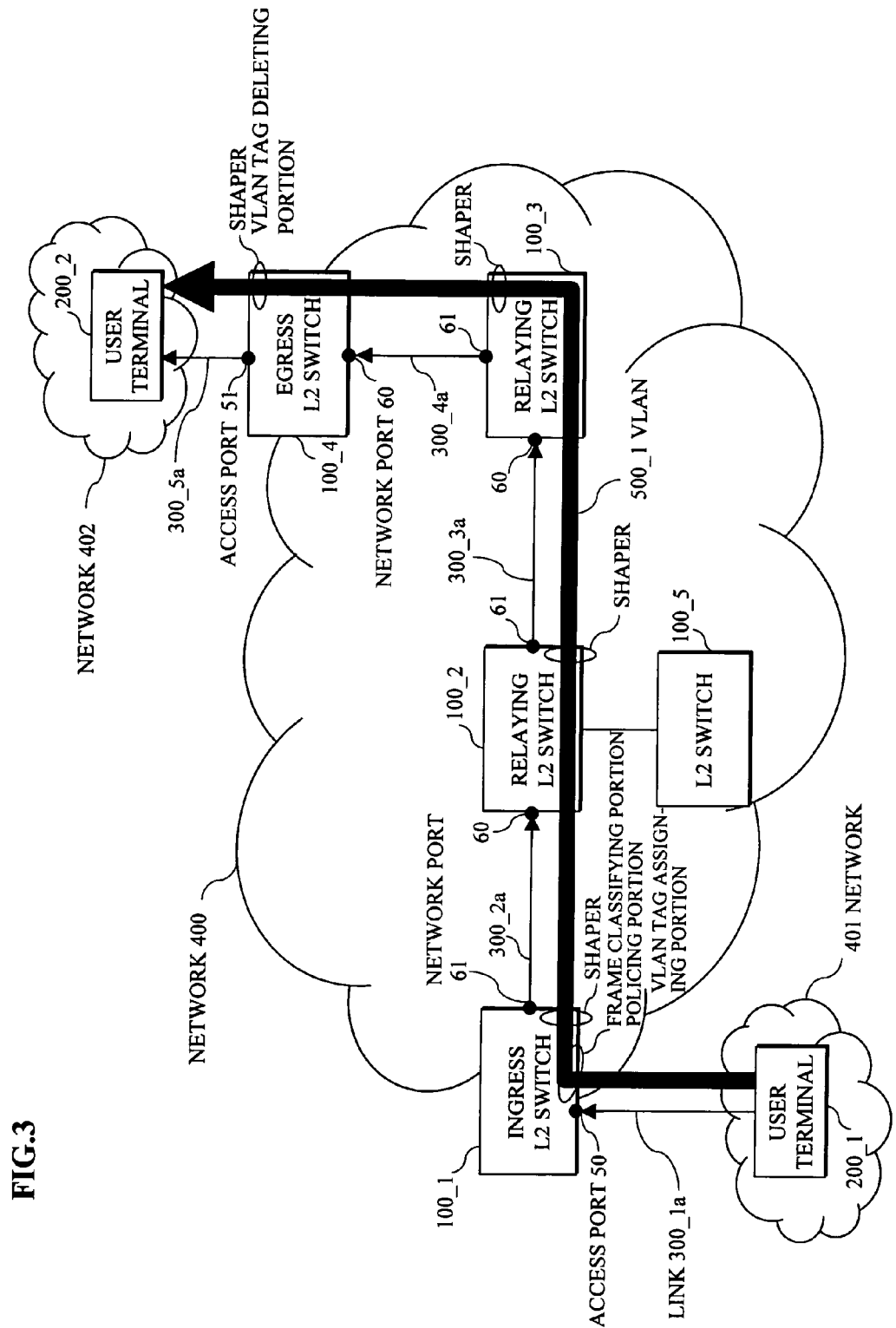
FIG. 3 is a block diagram showing an arrangement of a network (one-way transmission) using an L2 switch according to the present invention.

FIG. 3 shows a network 400 composed of the L2 switch 100 of the present invention. The network 400 is composed of the L2 switches 100_1-100_4 sequentially connected in cascade with links 300_2a-300_4a, and an L2 switch 100_5 connected to the L2 switch 100_2 with a link. It is to be noted that hereinafter, the L2 switches 100_1-100_5 will be occasionally represented by a reference numeral "100".

Moreover, a user terminal 200_1 is connected to the L2 switch 100_1 with a link 300_1a, and a user terminal 200_2 is connected to the L2 switch 100_4 with a link 300_5a. Also, a VLAN 500_1 is established between the user terminals 200_1 and 200_2.

In FIG. 3, in order to show a simplified relationship between the L2 switch 100 in the user edge shown in FIG. 1A and the L2 switch 100 on the network side shown in FIG. 2A, only a transmission line in one direction from the user terminal 200_1 to the user terminal 200_2 in the VLAN 500_1 is specifically shown.

Generally, the VLAN 500_1 further includes a transmission line in the opposite direction from the user terminal 200_2 to the user terminal 200_1.

The L2 switch 100_1 is provided with the ingress portion 10 and the switch fabric 20 shown in FIG. 1A, and the egress portion 30a shown in FIG. 2A. Hereinafter, the L2 switch 100_1 will be occasionally referred to as the ingress L2 switch 100_1 since it is an edge L2 switch on the input side.

The L2 switches 100_2 and 100_3 are the same as the L2 switch 100 on the network side shown in FIG. 2A. Hereinafter, the L2 switches 100_2 and 100_3 will be occasionally referred to as the relaying L2 switches.

The L2 switch 100_4 is provided with the ingress portion 10a and the switch fabric 20 shown in FIG. 2A, and the egress portion 30 shown in FIG. 1A. Hereinafter, the L2 switch 100_4 will be occasionally referred to as the egress L2 switch 100_4 since it is an edge L2 switch on the output side.

A frame transmitted from the user terminal 200_1 to the user terminal 200_2, that is the frame having no VLAN tag information field 800 attached to the frame 700 shown in FIG. 1C, is provided to the ingress L2 switch 100_1 through the link 300_1a.

In the ingress portion 10 (see FIG. 1A) of the ingress L2 switch 100_1, the VLAN tag assigning portion 12 adds the VLAN tag information field 800 (see FIG. 1C) to the frame received through the physical port (access port) 50 and the physical layer interface 11.

Also, the VLAN tag assigning portion 12, the frame classifying portion 13, and the policing portion 14 respectively set the VLAN identifier 800_4, the service class 800_2a, and the discard bit 800_2b in the VLAN tag information field 800.

On the other hand, the link state monitor 16 in the OAM monitor 15 monitors the frame belonging to the VLAN 500_1 and indicates the state of the link on the link state table 17 through the CPU 40.

When the link state table 17 indicates that a frame has not arrived for equal to or more than a predetermined time interval, the OAM inserter 18 transmits to the switch fabric an OAM frame (indicating normal state) belonging to the VLAN 500_1 at a predetermined time interval.

The OAM frame has an identifier of e.g. the VLAN 500_1 added thereto, and is transmitted to the egress L2 switch 100_4 through the VLAN 500_1 by the same transmission procedure as that for the normal frame 700 which will be described hereinafter.

The switch fabric 20 switches the frame 700 based on the VLAN identifier 800_4 set therein to be provided to the egress portion 30a (see FIG. 2A) of the ingress L2 switch 100_1.

In the egress portion 30a, the shaper 32 discards the frame 700 having congested, based on the discard bit 800_2b set in the frame 700. Moreover, the shaper 32 preferentially reads out the frame 700 with a high priority based on the service class 800_2a set in the frame 700 to be provided to the VLAN tag deleting portion 33.

The VLAN tag deleting portion 33 outputs the frame that is the frame 700 having the VLAN tag information field 800 deleted therefrom to the link 300_2a through the physical layer interface 34 and the physical port (network port) 61.

The relaying L2 switch 100_2 receives the frame from the link 300_2a through the network port 60, and performs the switching and the shaping respectively based on the VLAN identifier 800_4 and the service class 800_2a added to the frame within the relaying L2 switch 100_2 itself.

Thereafter, the relaying L2 switch 100_2 outputs the frame having the VLAN tag information field 800 including the VLAN identifier 800_4 and the service class 800_2a deleted therefrom to the link 300_3a through the network port 61.

The relaying L2 switch 100_3, in the same way as the relaying L2 switch 100_2, receives the frame from the link 300_3a through the network port 60, performs the switching and the shaping, and then transmits it to the link 300_4a through the network port 61.

The egress L2 switch 100_4 adds the VLAN tag information field 800 including the VLAN identifier 800_4 and the service class 800_2a (see FIGS. 2A-2C) to the frame received from the link 300_4a through the network port 60, performs the switching and the shaping respectively based on the VLAN identifier 800_4 and the service class 800_2a, and then outputs it to the link 300_5a through the access port 51. The user terminal 200_2 receives the frame from the link 300_5a.

Thus, between the user terminals 200_1 and 200_2 belonging to the VLAN 500_1, the frame addressed to the user terminal 200_2 is transmitted from the user terminal 200_1 to the user terminal 200_2.

The OAM monitor 31 of the egress L2 switch 100_4 receives the OAM frames (indicating normal state) inserted by the ingress L2 switch 100_1, and determines that the transmission line related to the VLAN 500_1 is normal if either of the normal user frame of the VLAN 500_1 or the OAM frames arrives within a predetermined time interval.

If neither of the normal user frames of the VLAN 500_1 nor the OAM frames arrives, the OAM monitor 31 regards that a failure has occurred on the transmission line, and shuts down the link 300_5a of the access port 51, thereby notifying the user terminal 200_2 of the disconnection of the VLAN 500_1 (leased line).

The frame transmission in the opposite one-way direction from the user terminal 200_2 to the user terminal 200_1 can be realized by configuring the L2 switch 100_4, the L2 switches 100_3 and 100_2, and the L2 switch 100_1 as the ingress L2 switch, the relaying L2 switches, and the egress L2 switch, respectively.

By combining the network configurations in one direction and in its opposite direction, a bidirectional frame transmission between the user terminals 200_2 and 200_1 belonging to the VLAN 500_1 is realized.

Figure 4:
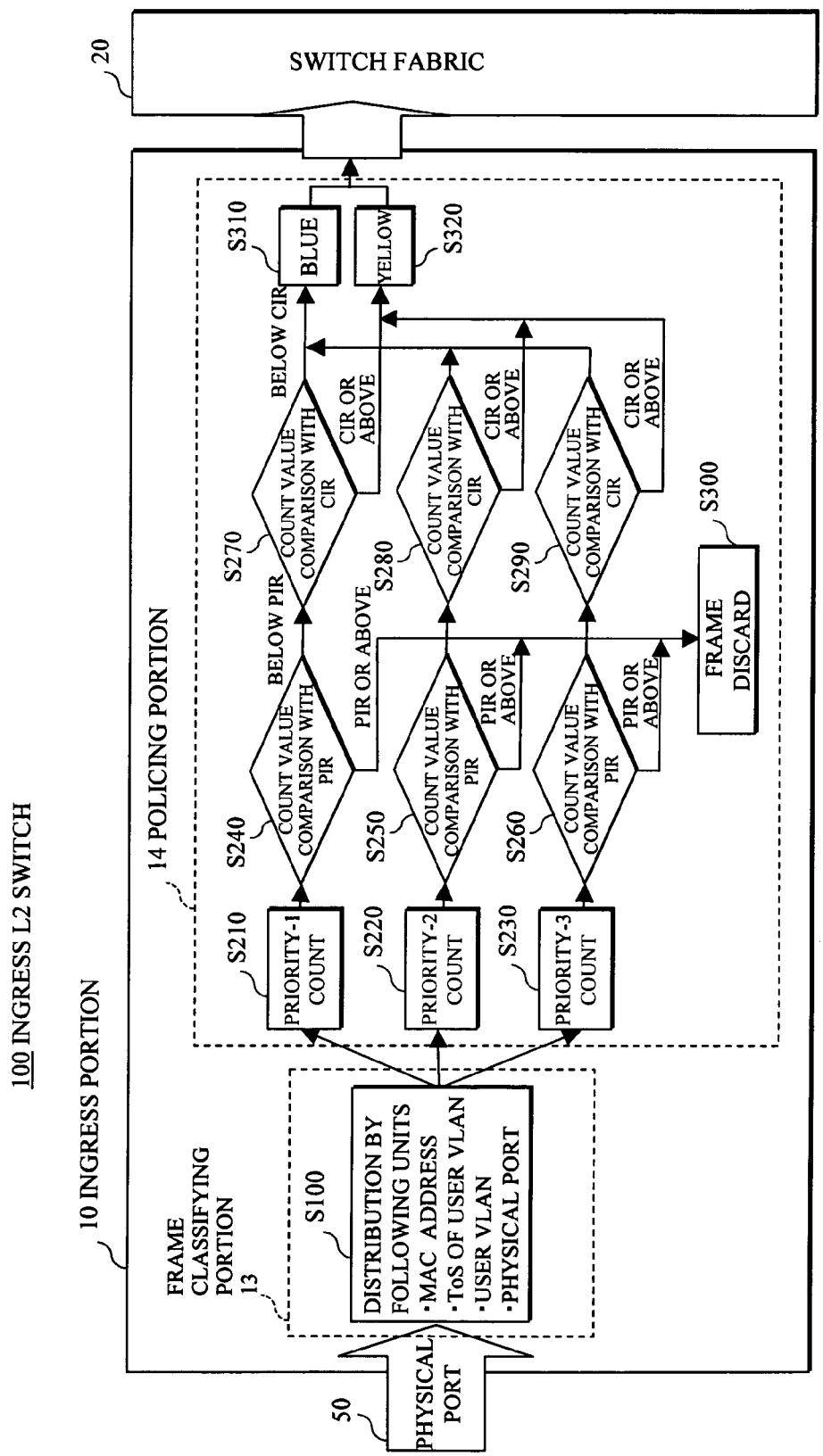
FIG. 4 is diagram showing an operational example of a frame classifying portion and a policing portion in an L2 switch according to the present invention.

FIG. 4 shows more detailed operations of the frame classifying portion 13 and the policing portion 14 shown in FIG. 1A. The operations of the frame classifying portion 13 and the policing portion 14 will now be described.

It is to be noted that the physical layer interface 11 and the VLAN tag assigning portion 12 are not shown in FIG. 4 for the simplification of the figure.

Step S100: The frame classifying portion 13 classifies the frame 700 based on at least one of the MAC address included in the frame, the user VLAN, and the Tos of the user VLAN, as well as the physical port number having received the frame into e.g. classes of priorities 1-3, and respectively sets the class of the service class 800_2a (see FIG. 1B).

Steps S210-S230: The policing portion 14 counts the frames of the priorities 1-3 respectively per predetermined time interval to measure a transmission rate (count value).

Steps S240-S260 and S300: The policing portion 14 compares the transmission rate (count value) of the priorities 1-3 respectively with a contracted PIR (Peak Information Rate), and discards the frame if the transmission rate is equal to or above the PIR.

Steps S270-S290, S310 and S320: The policing portion 14 compares the transmission rate (count value) of the priorities 1-3 respectively with a contracted CIR (Committed Information Rate), and sets e.g. "0(blue: nondiscardable)" to the discard bit 800_2b (see FIG. 1B) of the frame whose transmission rate is below CIR, while setting e.g. "1 (yellow: discardable)" to the discard bit 800_2b if the transmission rate is equal to or above the CIR.

Thus, the frame breaching the PIR contract is discarded, and each frame is colored according to the priority thereof and whether or not the frame is discardable.

Figure 5:
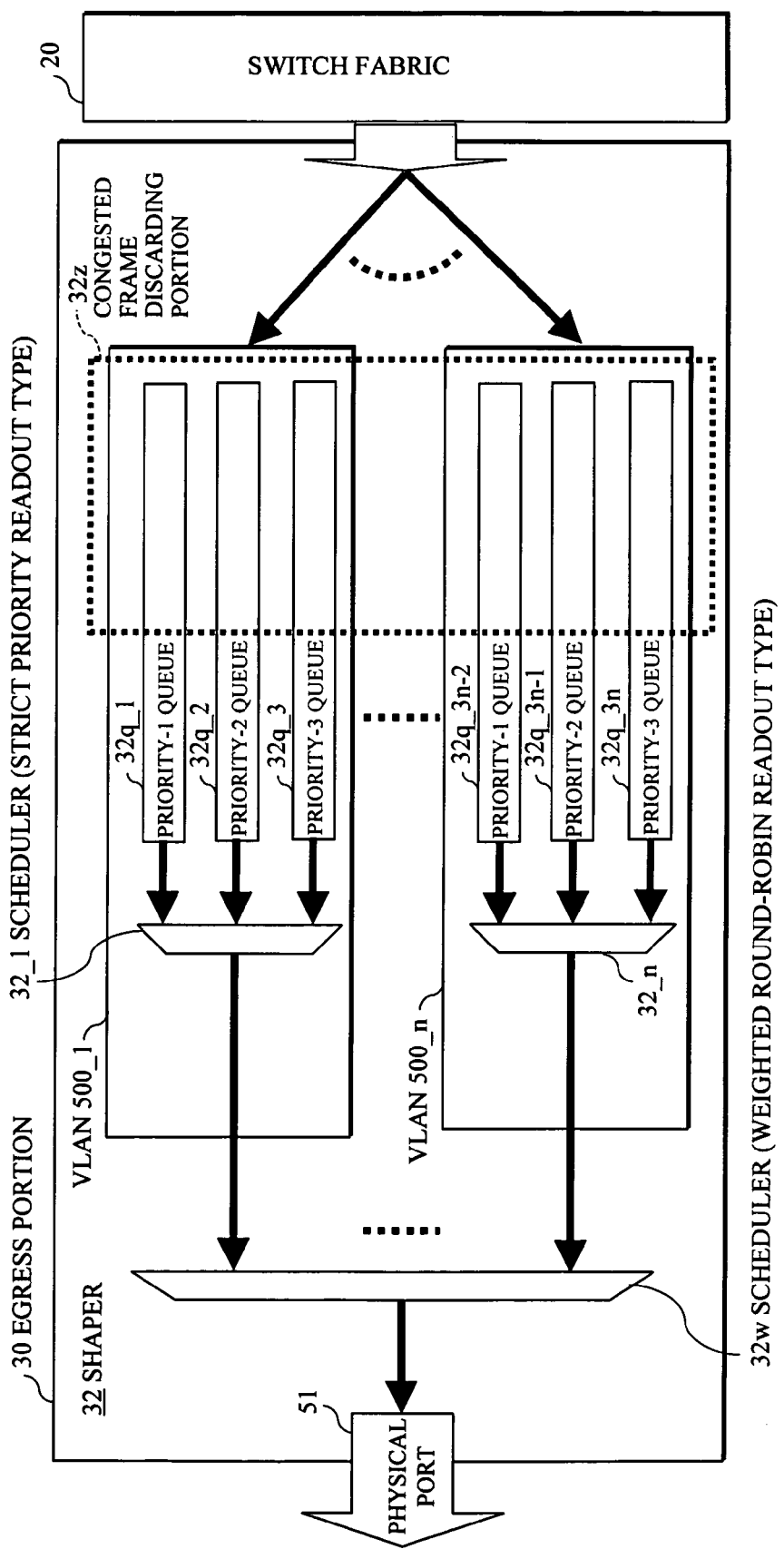
FIG. 5 is a block diagram showing an arrangement (1) of a shaper in an L2 switch according to the present invention.

FIG. 5 shows an embodiment (1) of the shaper 32 shown in FIGS. 1A and 2A. The shaper 32 determines the frame to be discarded and the order of frame transmission based on the VLAN identifier 800_4, the service class 800_2a, and the discard bit 800_2b (see FIGS. 1B and 1C).

The shaper 32 is provided with queues 32q_1-32q_3, ..., 32q_3n-32q_3n (hereinafter, occasionally represented by a reference numeral 32q), and schedulers 32_1-32__n of a strict priority readout type for reading out the frame in the order of higher priority from the queues 32q of the priorities 1-3.

Also, the shaper 32 is provided with a WRED (Weighted Random Early Detection) function, and a congested frame discarding portion 32z discarding a frame with the discard bit 800_2b="1 (yellow: discardable)" included therein when a congestion occurs in each queue 32q.

Moreover, the shaper 32 is provided with a scheduler 32w of a weighted round-robin readout type for reading out the frame sequentially from the schedulers 32_1-32__n.

The priority-1 queue 32q_1 queues the frame with the VLAN identifier 800_4="VLAN 500_1" and the service class 800_2a="priority-1" included therein from among the frames outputted from the switch fabric 20.

Similarly, the priority-2 queue 32q_2 queues the frame with the VLAN identifier 800_4="VLAN 500_1" and the service class 800_2a="priority-2" included therein, and the priority-3 queue 32q_3 queues the frame with the VLAN identifier 800_4="VLAN 500_1" and the service class 800_2a="priority-3" included therein.

Thereafter, frames are queued likewise in the queues 32q corresponding to the VLANs 500_2-500__n.

When a congestion occurs in the queues 32q, the congested frame discarding portion 32z discards the frame with the discard bit 800_2b="0 (yellow: discardable)" included therein. Thus, the frames of the transmission rate equal to or above the contracted CIR can be discarded.

The scheduler 32_1 preferentially reads out the frame from the queue 32q with the high priority. Thus, the frames are read out in the descending order of priorities per VLAN.

The scheduler 32w reads out the frame read out by the scheduler 32_1-32__n with a weighted round-robin method and with a bandwidth equal to or higher than that guaranteed by the CIR to be outputted. Namely, among the VLANs 500_1-500__n, the frame transmission is performed regardless of the priorities.

Thus, a moderately priced and highly reliable bandwidth guarantee is made possible without using expensive SDH/SONET transmission apparatuses, ATM apparatuses, and WDM apparatuses.

Figure 6:
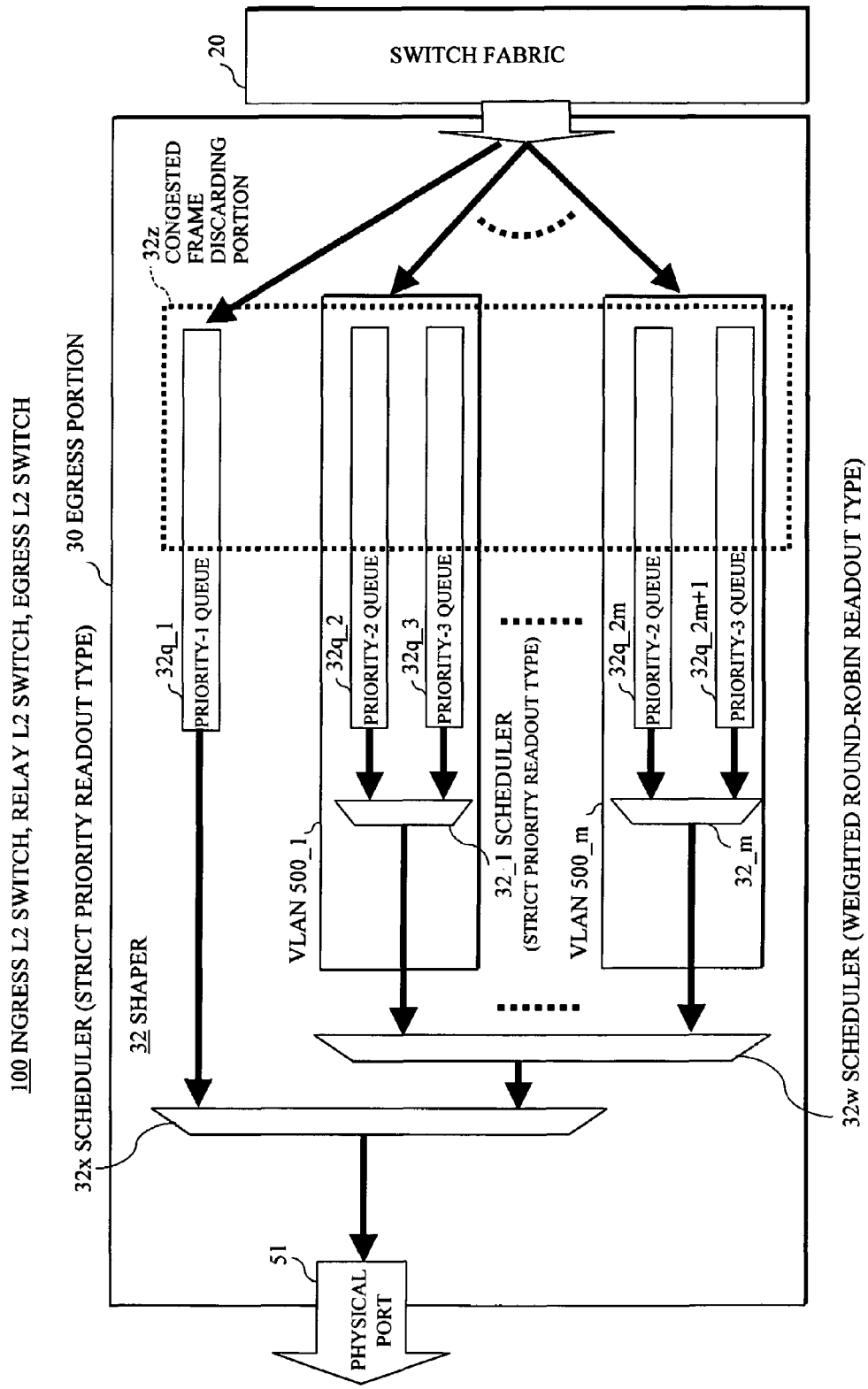
FIG. 6 is a block diagram showing an arrangement (2) of a shaper in an L2 switch according to the present invention.

FIG. 6 shows an embodiment (2) of the shaper 32. The shaper 32, in the same way as the shaper 32 of the embodiment (1) shown in FIG. 5, determines the discarding of frames and the priorities of frame transmission based on the VLAN identifier 800_4, the service class 800_2a, and the discard bit 800_2b.

The embodiment (2) is different from the embodiment (1) in that the priority-1 queue is not provided per each of the corresponding VLANs 500_1-500__m but a single priority-1 queue 32q_1 corresponding to the VLANs 500_1-500__m is provided. Therefore, priority queues respectively corresponding to the VLANs 500_1-500__m are the priority-2 queues and the priority-3 queues.

For example, a priority-2 queue 32q_2 and a priority-3 queue 32q_3 respectively correspond to the VLAN 500_1, and a priority-2 queue 32q_2m, and a priority-3 queue 32q_2m+1 correspond to the VLAN 500__m.

The schedulers 32_1-32__m and 32w of the embodiment (2) respectively correspond to the schedulers 32_1-32__n and 32w of the embodiment (1), so that the schedulers 32_1-32__m preferentially read out the frames queued in the priority-2 that is a higher priority in each of the VLANs 500_1-500__m.

The scheduler 32w of the embodiment (2) reads out the frame from the schedulers 32_1-32__m with the weighted round-robin method.

Also, the shaper 32 of the embodiment (2) is different from that of the embodiment (1) in that a scheduler 32x is provided for preferentially reading out the frame from the priority-1 queue 32_1 from among the priority-1 queue 32q_1 and the scheduler 32w to be outputted.

The priority-1 queue 32q_1 queues the frame with the highest priority indicated by the service class 800_2a from among the frames outputted from the switch fabric 20 irrespective of the VLAN identifier included in the frame.

The frames outputted from the switch fabric 20 are queued, in the same way as the embodiment (1), by the priority-2 and the priority-3 included in the frame per VLANs 500_1-500__m to be read out according to the priorities.

The frame read out per each of the VLANs 500_1-500__m is read out by the scheduler 32w with the weighted round-robin readout method. The scheduler 32x reads out with first preference the frame of the priority-1 queue 32q_1 from among the frame read out by the scheduler 32 and the frame queued in the priority-1 queue 32q_1.

Thus, a moderately priced and highly reliable bandwidth guarantee is also made possible without using expensive SDH/SONET transmission apparatuses, ATM apparatuses, and WDM apparatuses.

FIGS. 7-11 show leased line service examples (1)-(5) using the VLAN 500_1 to which the user terminals 200_1 and 200_2 belong, established between the ingress L2 switch 100_1 and the egress L2 switch 100_4 as shown in FIG. 3. Therefore, a contract unit of the leased line service is the VLAN 500_1.

Figure 7:
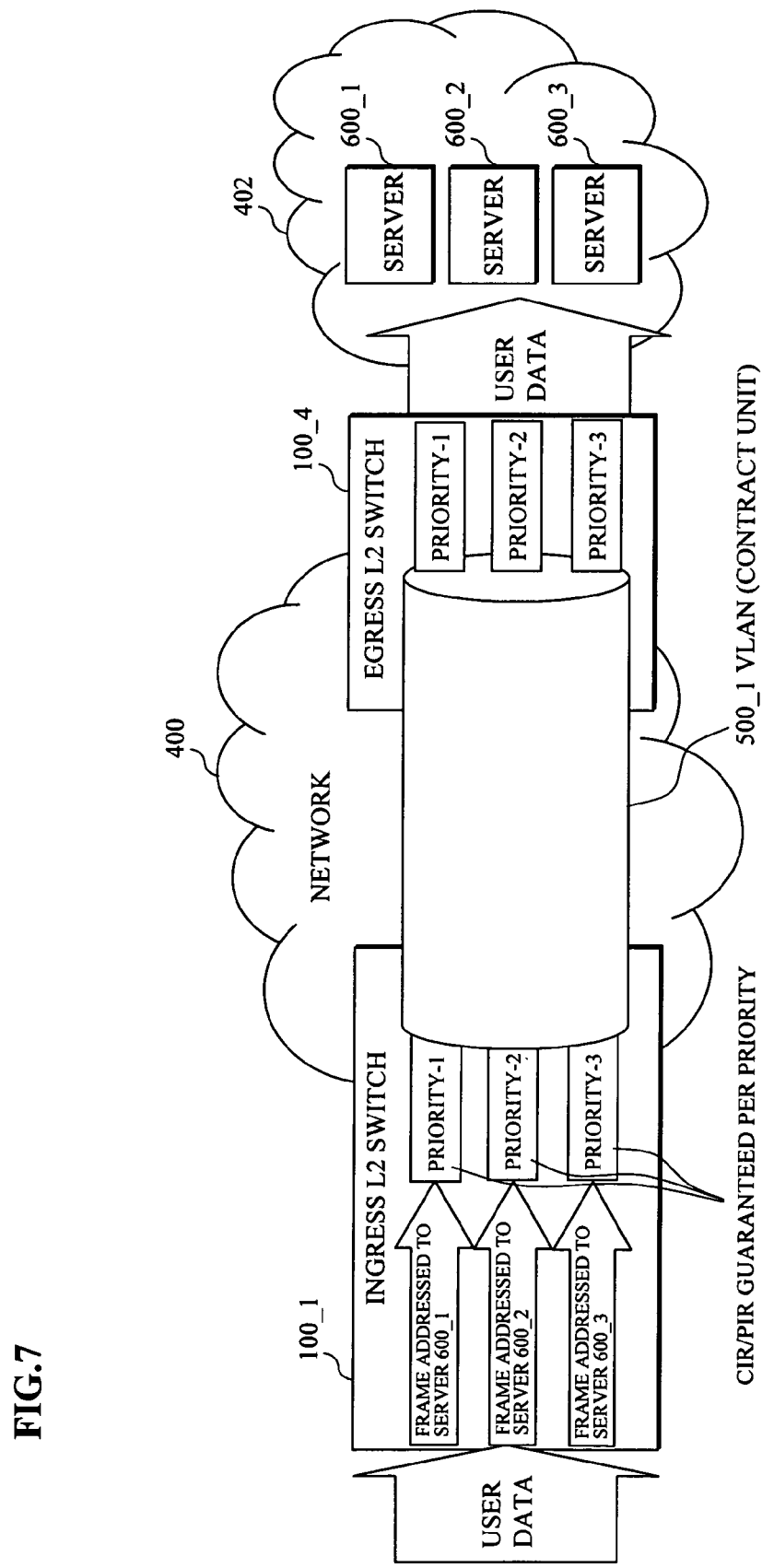
FIG. 7 is a block diagram showing priorities and a bandwidth guarantee in an example (1) of a leased line service between an ingress L2 switch and an egress L2 switch according to the present invention.

In the leased line service example (1) shown in FIG. 7, the ingress portion 10 (see FIG. 1A) of the ingress L2 switch 100_1 is provided with the frame classifying portion 13 for classifying the frame into 3 classes (priorities 1-3) per MAC address (per each of servers 600_1-600_3) and the policing portion 14 for guaranteeing the CIR/PIR per priority.

Also, the egress portion 30 (see FIG. 1A) of the egress L2 switch 100_4 is provided with the shaper 32 having 3 queues corresponding to the priorities 1-3 per VLAN.

With such an arrangement, user frames addressed to the servers 600_1-600_3 can be classified into 3 classes (priorities 1-3) based on the MAC addresses of the servers, and a committed information rate (CIR) and a peak information rate (PIR) can be guaranteed per class.

For example, it is made possible to provide a user with 3 classes, which are classified by the MAC addresses of the destination servers, so as to guarantee a bandwidth per class, and to assign the classes to different users, so as to guarantee a bandwidth per user (=per class).

Thus, the classification by the MAC address and the CIR/PIR guarantee per class of the provided leased line are made possible. Also, a delay of communication to a specific device, e.g. the server 600_1 can be reduced.

Figure 8:
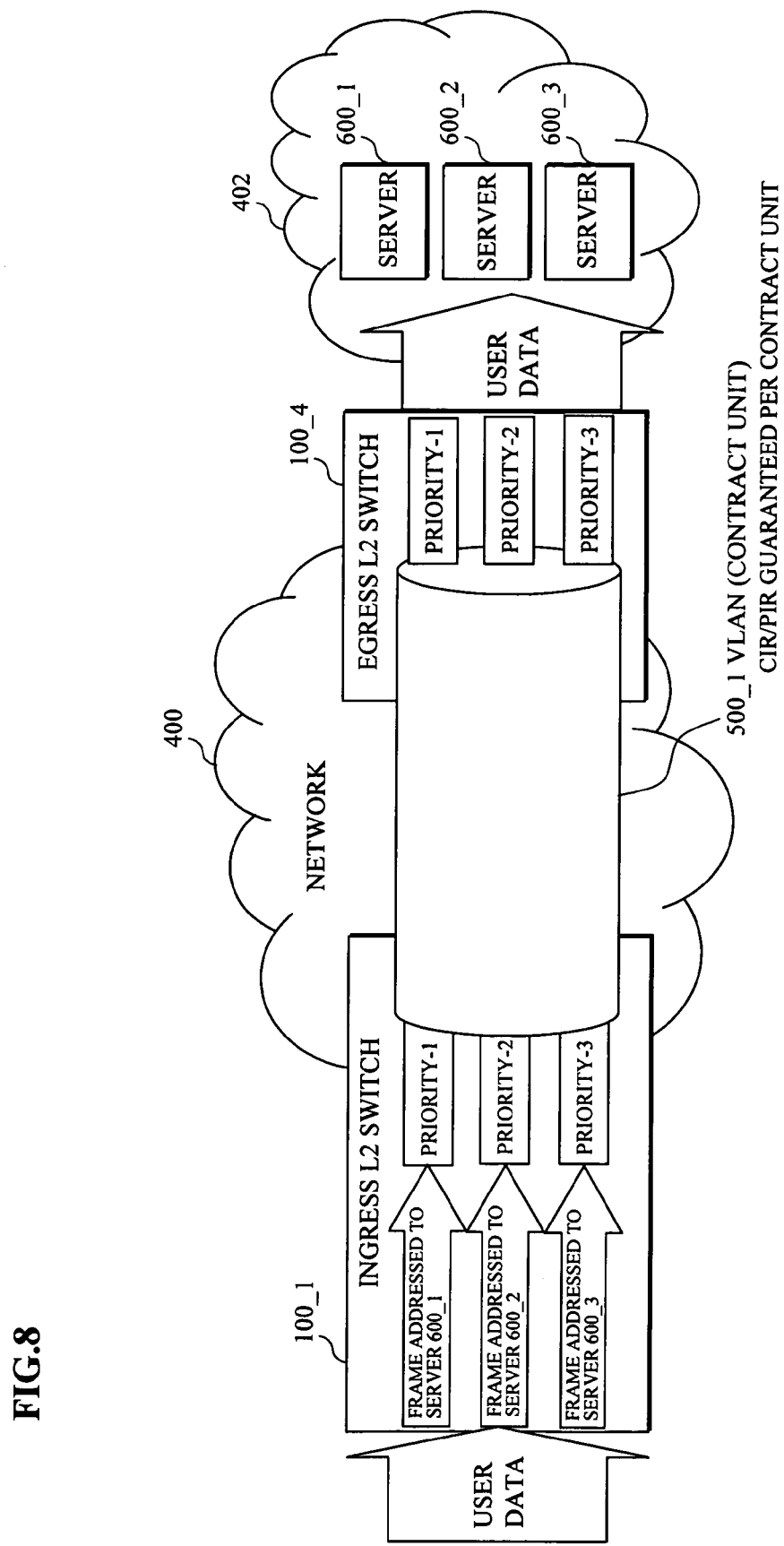
FIG. 8 is a block diagram showing priorities and a bandwidth guarantee in an example (2) of a leased line service between an ingress L2 switch and an egress L2 switch according to the present invention.

In the leased line service example (2) shown in FIG. 8, the ingress portion 10 of the ingress L2 switch 100_1 is provided with the frame classifying portion 13 for classifying the frame into 3 classes (priorities 1-3) per MAC address and the policing portion 14 for guaranteeing the CIR/PIR per port. Also, the egress portion 30 of the egress L2 switch 100_4 is provided with the shaper 32 having queues corresponding to the priorities 1-3 per VLAN.

In this leased line service example (2), the user frames addressed to the servers 600_1-600_3 can be classified into 3 classes (priorities 1-3) based on the MAC addresses of the servers 600_1-600_3, and a committed information rate (CIR) and a peak information rate (PIR) totalized for the 3 classes can be guaranteed.

For example, a user is provided with 3 classes, which are classified by the MAC addresses of the destination servers, and a bandwidth for the user for the total of 3 classes is guaranteed.

Thus, the classification by the MAC address and the CIR/PIR guarantee per contract of the provided leased line are made possible. Also, a delay of communication to a specific device, e.g. the server 600_1 with priority-1, can be reduced.

Figure 9:
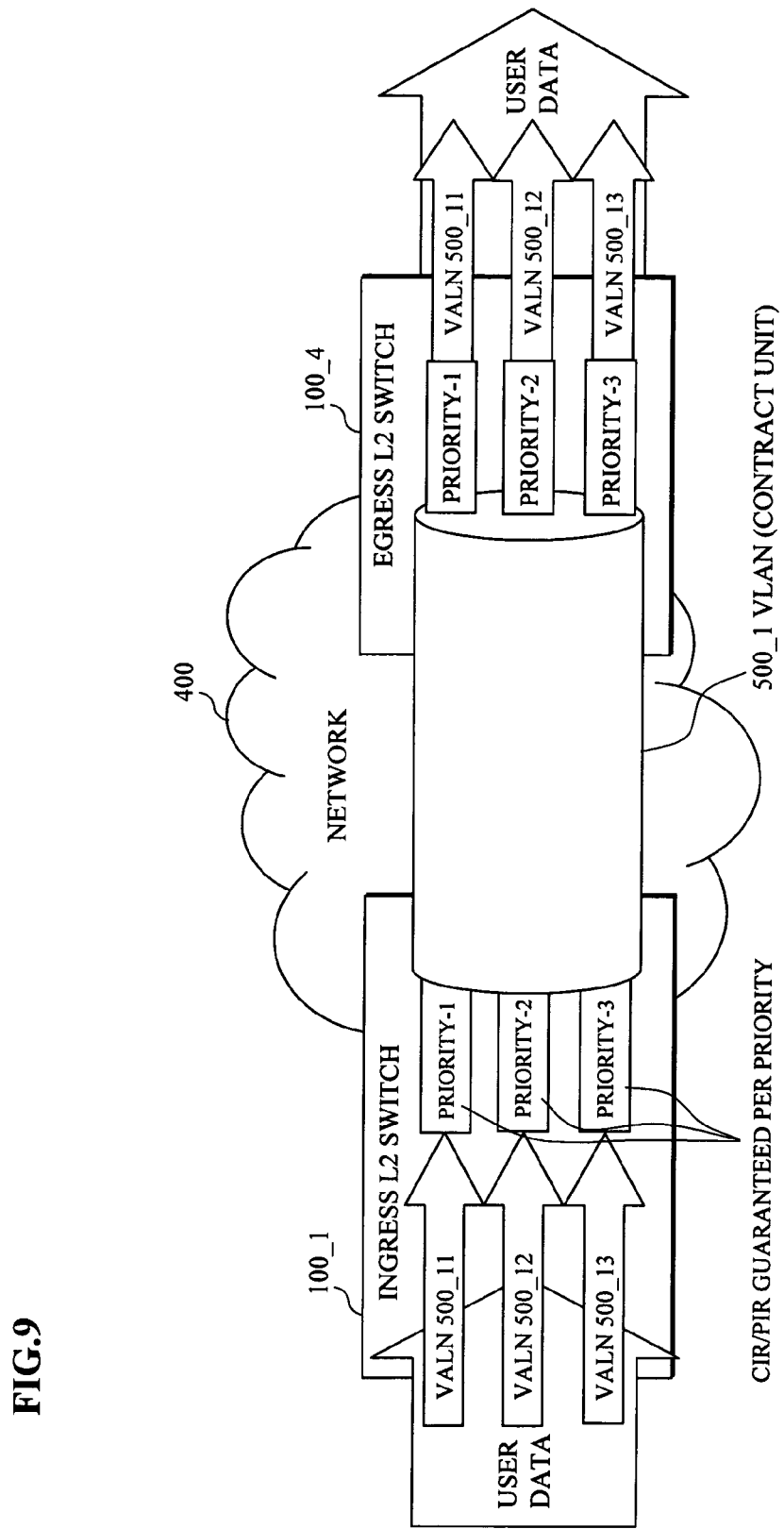
FIG. 9 is a block diagram showing priorities and a bandwidth guarantee in an example (3) of a leased line service between an ingress L2 switch and an egress L2 switch according to the present invention.

In the leased line service example (3) shown in FIG. 9, the ingress portion 10 of the ingress L2 switch 100_1 is provided with the frame classifying portion 13 for classifying the frame into 3 classes (priorities 1-3) per each of user VLANs 500_11-500_13 and the policing portion 14 for guaranteeing the committed information rate (CIR) and the peak information rate (PIR) per priority (class).

Also, the egress portion 30 of the egress L2 switch 100_4 is provided with the shaper 32 having queues corresponding to the priorities 1-3 per VLAN.

In this leased line service example (3), the frame is classified into classes (priorities 1-3) based on the user VLAN identifier (see FIG. 1C), and the committed information rate (CIR) and the peak information rate (PIR) per class are guaranteed.

For example, it is made possible to provide a user with 3 classes, which are classified by the VLANs, so as to guarantee a bandwidth per class, and to assign the classes to different users so as to guarantee a bandwidth per user (=per class).

Thus, the classification by the user VLAN identifier and the CIR/PIR guarantee per class are made possible. Also, a frame delay can be reduced depending on the priority set by the user.

Figure 10:
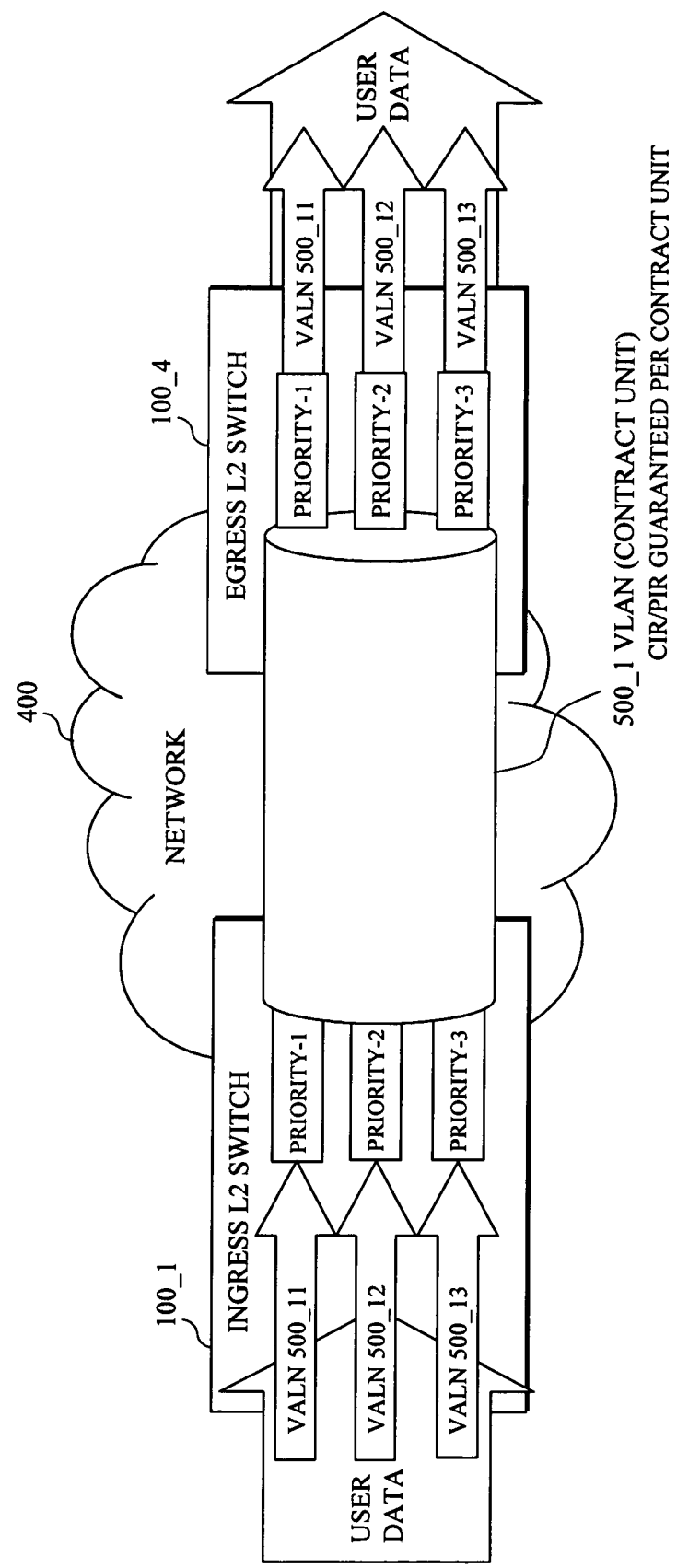
FIG. 10 is a block diagram showing priorities and a bandwidth guarantee in an example (4) of a leased line service between an ingress L2 switch and an egress L2 switch according to the present invention.

In the leased line service example (4) shown in FIG. 10, the ingress portion 10 of the ingress L2 switch 100_1 is provided with the frame classifying portion 13 for classifying the frame into 3 classes per user VLAN (each of VLANs 500_11-500_13) and the policing portion 14 for guaranteeing the committed information rate (CIR) and the peak information rate (PIR) per port.

Also, the egress portion 30 of the egress L2 switch 100_4 is provided with the shaper 32 having 3 queues per VLAN.

In this leased line service example (4), the frame can be classified into classes (priorities 1-3) based on the user VLAN identifier, and the committed information rate (CIR) and the peak information rate (PIR) totalized for the 3 classes can be guaranteed. For example, a user is provided with 3 classes, which are classified by the VLANs, and a bandwidth totalized for the 3 classes for the user is guaranteed.

Thus, the classification by the user VLAN identifier and the CIR/PIR guarantee per contract for the provided leased line are made possible. Also, a frame delay can be reduced depending on the priority set by the user.

Figure 11:
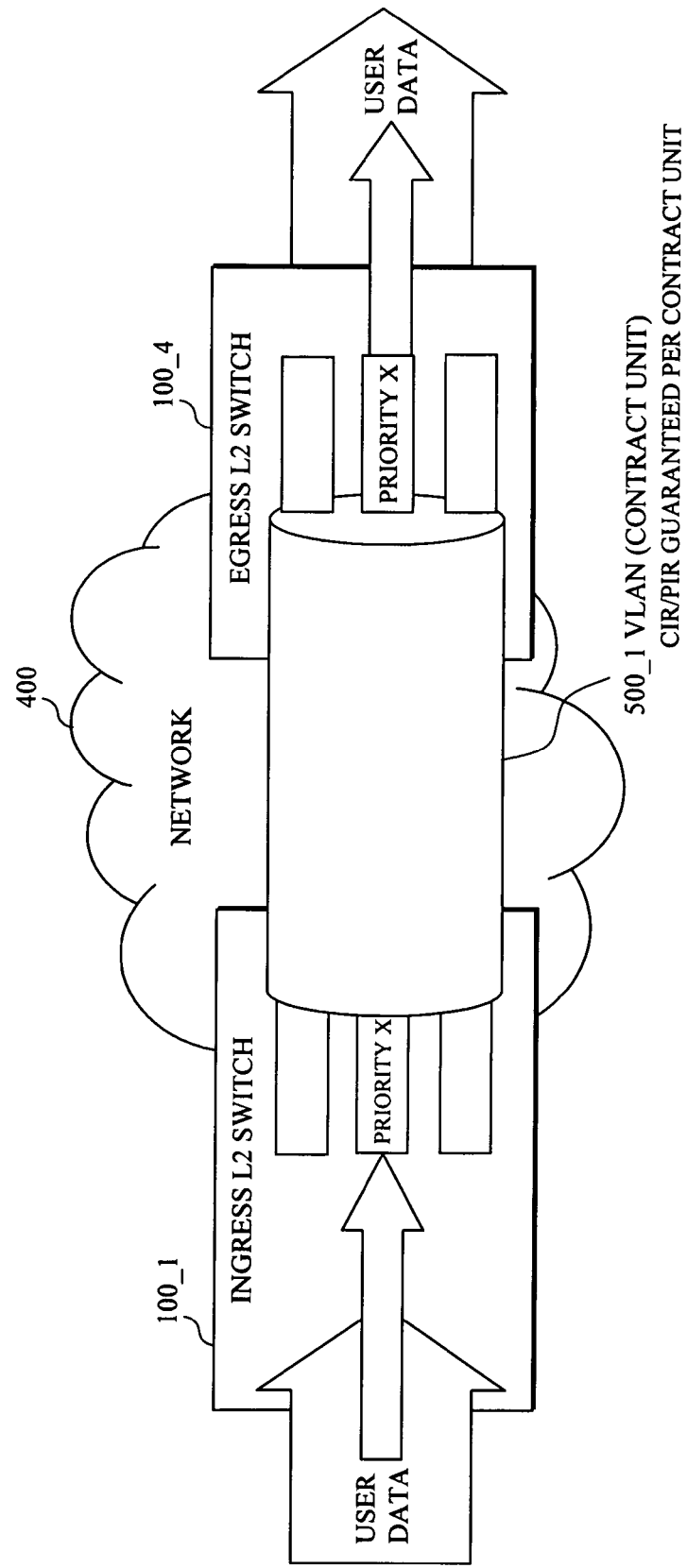
FIG. 11 is a block diagram showing priorities and a bandwidth guarantee in an example (5) of a leased line service between an ingress L2 switch and an egress L2 switch according to the present invention.

In the leased line service example (5) shown in FIG. 11, the ingress portion 10 of the ingress L2 switch 100_1 is provided with the frame classifying portion 13 for classifying the frame into 3 classes per port and the policing portion 14 for guaranteeing the committed information rate (CIR) and the peak information rate (PIR) per port.

Also, the egress portion 30 of the egress L2 switch 100_4 is provided with the shaper 32 having a queue corresponding to the priority-1 and queues corresponding to the priority-2 and the priority-3 per VLAN.

In this leased line service example (5), a class (one of the priorities 1-3) is selected per physical port, and a bandwidth per user VLAN identifier is guaranteed. For example, a specific priority is given to a frame from a certain port, and the bandwidth per VLAN identifier is guaranteed.

Thus, a priority assignment per port and the CIR/PIR guarantees per contract of the provided leased line are made possible. Also, a priority within a network can be set for a contracted line.

Figure 12:
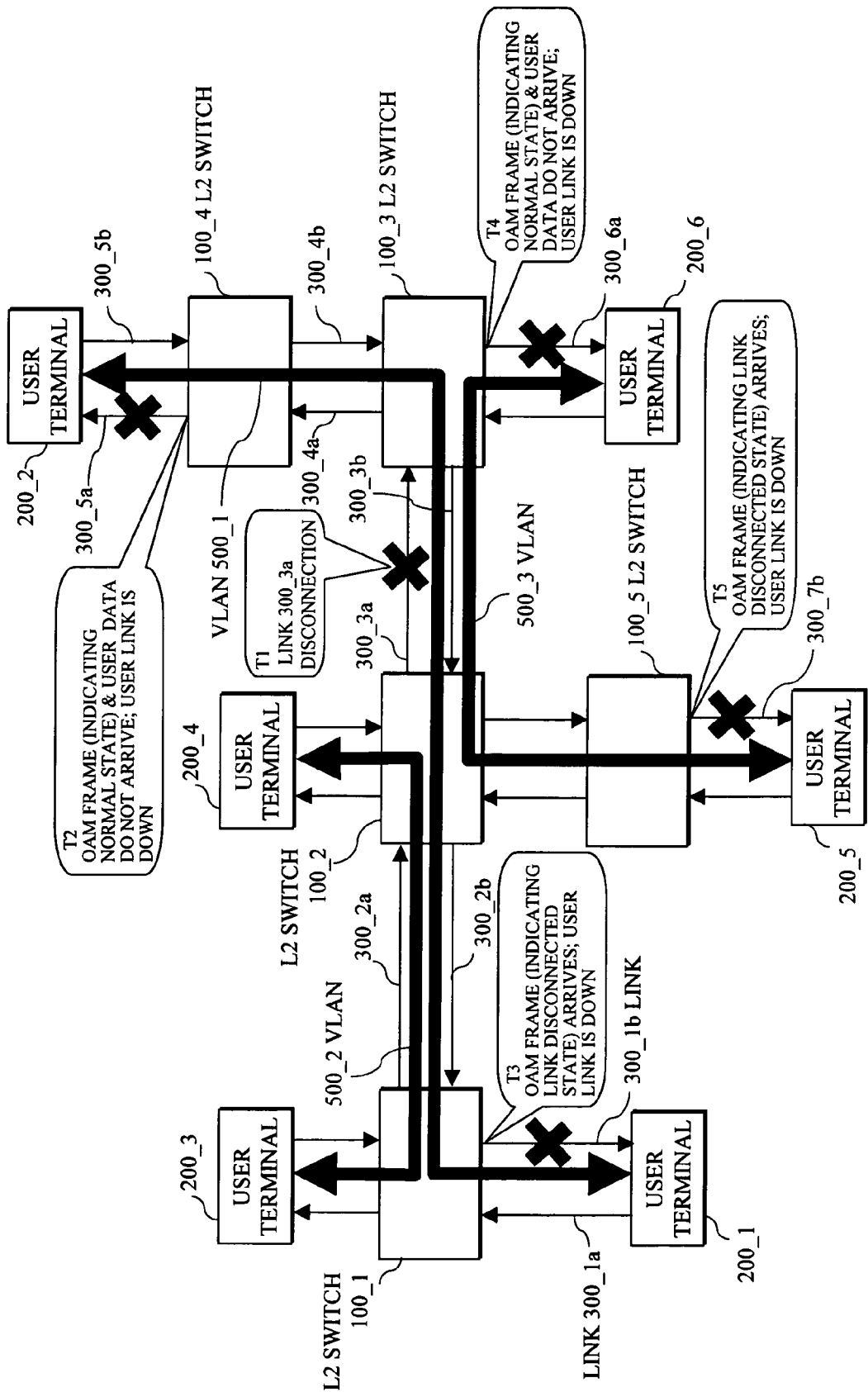
FIG. 12 is a block diagram showing a network arrangement (upon occurrence of link disconnection) using an L2 switch according to the present invention.

FIG. 12 shows a network composed of the L2 switch 100 of the present invention. This network is composed of the L2 switches 100_1-100_4 sequentially connected in cascade with links 300_2a and 300_2b, links 300_3a and 300_3b, and links 300_4a and 300_4b, as well as the L2 switch 100_5 connected to the L2 switch 100_2 with links.

Moreover, user terminals 200_1 and 200_3 are connected to the L2 switch 100_1, and user terminals 200_4, 200_6, 200_2, and 200_5 are respectively connected to the L2 switches 100_2-100_5. It is to be noted that hereinafter, the user terminals 200_1-200_6 will be occasionally represented by a reference numeral "200".

Furthermore, the VLAN 500_1 is established between the user terminals 200_1 and 200_2, the VLAN 500_2 is established between the user terminals 200_3 and 200_4, the VLAN 500_3 is established between the user terminals 200_5 and 200_6.

The L2 switches 100_1-100_5 are respectively provided with the ingress portion 10 and the egress portion 30 shown in FIG. 1A on the link side to which the user terminals 200 are connected, as well as the ingress portion 10a and the egress portion 30a shown in FIG. 2A on the side to which the other L2 switches 100 are connected.

In this network, a link disconnection transfer function is provided for utilizing an OAM (Operation, Administration and Maintenance) frame to disconnect a line on the end user side when a portion of the leased line is disconnected. This link disconnection transfer function is provided in the egress portion 30 of the L2 switch which is an edge of a user.

In the L2 switch of the present invention, in order to provide Ethernet leased line services of a transmission rate equal to or higher than the that of a physical port, a VLAN function per trunk such as a link aggregation defined by the IEEE802.3ad is used.

Thus, by combining the function of the L2 switch 100 of the present invention and the link aggregation, for example, the L2 switch 100 having only an interface of a transmission rate of 1 Gbps can provide a leased line service of several Gbps.

Generally, in e.g. the OAM monitor 15 of the ingress portion 10 (see FIG. 1A) of the L2 switch 100_1, the link state monitor 16 monitors the traffic of e.g. the user terminal 200_1, doing nothing if the traffic is flowing, but notifying the OAM inserter 18 through the link state table 17 if the user terminal 200_1 is not flowing the traffic.

The OAM inserter 18 inserts an OAM frame (indicating normal state) to the VLAN 500_1 through switch fabric 20.

Also, upon detecting a link disconnection, the OAM inserter 18 forcibly inserts an OAM frame (indicating link disconnected state) into the VLAN 500_1 through switch fabric 20.

Since the trunk of the link aggregation and the like are considered upon detecting the link disconnection, the state of a port trunked in the physical layer interface 11 is held in the link state table.

Since the link disconnection transfer is initiated based on the link state table 17, it is made possible to set triggers of link disconnection transfer for cases of a single port disconnection, all ports disconnection, and the like.

A link down transfer in a case where the link 300_3a of this network goes down will now be described.

Step T1: The link of the link 300_3a is dicsonnected.

Step T2: In the egress portion 30 of the L2 switch 100_4, the OAM monitor 31 is monitoring the user frame and the OAM frame, and notifies the fact that both of the user frame and the OAM frame (indicating normal state) have not arrived to the link down transferring portion 35.

The link down transferring portion 35 performs a link down transfer for shutting down the link 300_5a which connects the user terminal 200_2 thereto, and forcibly inserts an OAM frame (indicating a link disconnected state) into the VLAN 500_1 in the opposite direction.

Step, T3: In the egress portion 30 of the L2 switch 100_1, the OAM monitor 31 receives the OAM frame (indicating a link disconnected state) and the link down transferring portion 35 disconnects the link 300_1b.

Step T4: In the same way as in step T2, the OAM monitor 31 in the egress portion 30 of the L2 switch 100_3 notifies the link down transferring portion 35 of the fact that both of the user frame and the OAM frame (indicating normal state) have not arrived.

The link down transferring portion 35 performs a link down transfer for shutting down the link 300_6a connected to the user terminal 200_6, and forcibly inserts an OAM frame (indicating a link disconnected state) into the VLAN 500_3 in the opposite direction.

Step T5: In the same way as in step T3, the OAM monitor 31 in the egress portion 30 of the L2 switch 100_5 receives the OAM frame (indicating a link disconnected state) so that the link down transferring portion 35 disconnects the link 300_7b.

Figure 13:
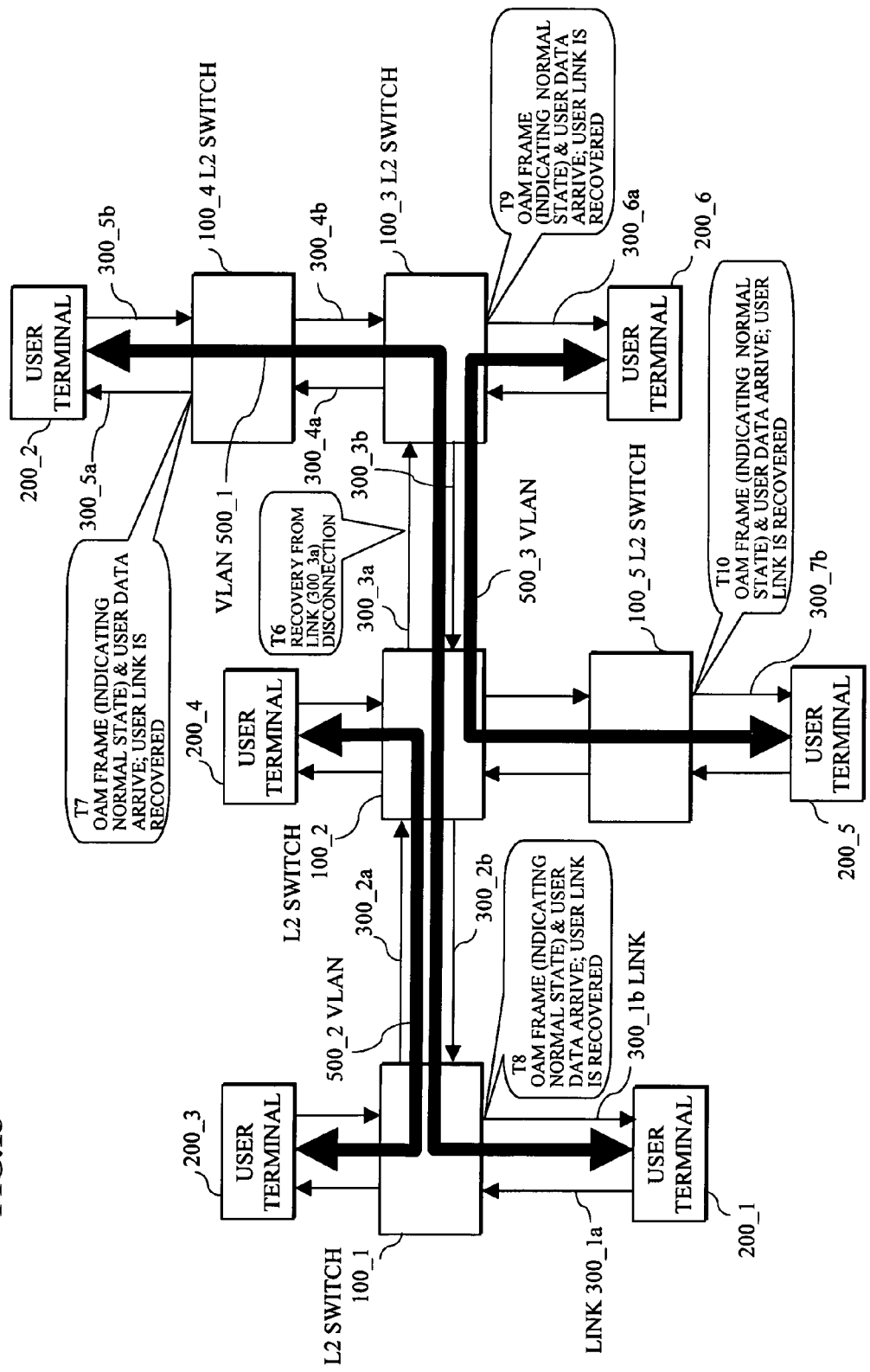
FIG. 13 is a block diagram showing a network arrangement (upon recovery from link disconnection) using an L2 switch according to the present invention.

FIG. 13 shows operations in a case where the disconnected link 300_3a in FIG. 12 has been recovered. The operations will now be described.

Step T6: The disconnection of the link 300_3a is recovered.

Step T7: In the egress portion 30 of the L2 switch 100_4, the OAM monitor 31 detects the OAM frame (indicating a normal state) and the user frame (traffic) and notifies the link down transferring portion 35 of the detection. The link down transferring portion 35 recovers the link 300_5a.

Step T8: In the same way as in step T7, the OAM monitor 31 detects the OAM frame (indicating a normal state) and the user frame (traffic) and notifies the link down transferring portion 35 of the detection. The link down transferring portion 35 recovers the link 300_1b.

Steps T9 and T10: In the same way as in steps T7 and T8, the links 300_6a and 300_7b are recovered.

It is to be noted that while an example of a case where a part of a contracted leased line is disconnected is shown in the above-mentioned link down transferring example, a link disconnection may be notified to the user also in a case where an access port is disconnected.

Also, a link down transfer validity/invalidity can be set in the link down transferring portion 35 (see FIG. 1A), thereby providing an Ethernet leased line service utilizing the link down transfer and an Ethernet leased line service not utilizing the link down transfer. Thus, the leased line services can be provided with added values.

Since the link down transfer by the L2 switch 100 of the present invention is an operation of only the L2 switch of the user edge, it is independent of the relaying L2 switch 100.

As described above, according to the L2 switch of the present invention, a VLAN functional portion maps a frame to a predetermined VLAN, a frame classifying portion assigns to the frame a first tag indicating a priority, and a policing portion assigns to the frame a second tag indicating whether or not the frame can be discarded. Therefore, it is made possible to provide a bandwidth guaranteed, inexpensive but highly reliable service.

Also, an OAM monitor inserts a monitoring frame into the VLAN. Therefore, it is made possible to provide an Ethernet leased line service by utilizing technologies such as a link down transfer.

What is claimed is:

1. An ingress L2 switch comprising:
    a VLAN functional portion mapping a frame to a predetermined VLAN;
    a frame classifying portion assigning to the frame a first tag indicating a priority preset with respect to the frame;
    a policing portion comparing a detected transmission rate of the frame with a preset transmission rate, and assigning to the frame a second tag indicating whether or not the frame can be discarded, wherein the VLAN functional portion assigns to the frame a VLAN tag identifying the mapped VLAN;
    a switch fabric switching the frame based on the VLAN tag; and
    a shaper outputting the frame based on the priority indicated by the first tag and discarding the frame having congested based on the second tag, wherein the shaper includes:
        a plurality of queues, each of which corresponds to the priority and queues the frame based on the priority indicated by the first tag for each VLAN;
        a first scheduler taking out the queued frame based on the priority of the queue for each VLAN; and
        a second scheduler taking out the frame taken out by the first scheduler by a weighted round-robin method.

2. The ingress L2 switch as claimed in claim 1, wherein the VLAN functional portion maps the frame to the VLAN based on at least one of a port number, a MAC address, a protocol, and an IP subnet address.

3. The ingress L2 switch as claimed in claim 1, wherein the priority is set based on at least one of a MAC address included in the frame, a user VLAN identifier included in the frame, a ToS of the user VLAN, and a physical port to which the frame is inputted.

4. The ingress L2 switch as claimed in claim 1, wherein the preset transmission rate is set per at least one of the priority, the VLAN, and the physical port to which the frame is inputted.

5. The ingress L2 switch as claimed in claim 1, wherein the policing portion classifies the frame into a discarding frame, a discardable frame, and a nondiscardable frame, and discards the discarding frame irrespective of the second tag.

6. The ingress L2 switch as claimed in claim 1, wherein the VLAN functional portion maps the frame to a VLAN per trunk.

7. The ingress L2 switch as claimed in claim 1, further comprising an OAM monitor inserting a monitoring frame into the VLAN.

8. The ingress L2 switch as claimed in claim 1, wherein the shaper comprises:
- M units of first queues, where M is a natural number, queuing frames with top M higher priorities based on the first tag;
- N units of second queues, where N is a natural number, queuing frames with lower priorities lower than the higher priorities based on the first tag for each VLAN;
- a first scheduler taking out the queued frame based on the priorities of the second queues for each VLAN;
- a second scheduler taking out the frame taken out by the first scheduler by a weighted round-robin method; and
- a third scheduler outputting the frames queued in the first queues in an order of the higher priorities in preference to the frame taken out by the second scheduler.

9. The ingress L2 switch as claimed in claim 1, farther comprising a VLAN tag assigning portion assigning a tag to the frame.

10. The ingress L2 switch as claimed in claim 1 wherein the shaper comprises a congested frame discarding portion discarding, based on the second tag, the frame having congested and queued in the queue.

11. A relaying L2 switch comprising:
- a port receiving a frame; and
- a shaper discarding the frame having congested based on a tag indicating whether or not the frame is discardable, wherein the shaper, assuming the tag be made a second tag, includes:
  - a first queue queuing the frame based on a first tag indicating a priority assigned to the frame for each VLAN, and corresponding to the priority;
  - a first scheduler taking out the queued frame based on the priority of the queue for each VLAN; and
  - a second scheduler taking out the frame taken out by the first scheduler by a weighted round-robin method.

12. The relaying L2 switch as claimed in claim 11, wherein the shaper, assuming the tag be made a second tag, comprises:
- M units of first queues, where M is a natural number, queuing frames with top M higher priorities based on the first tag which indicates a priority added to the frame;
- N units of second queues, where N is a natural number, queuing frames with lower priorities lower than the higher priorities based on the first tag for each VLAN;
- a first scheduler taking out the queued frame based on the priorities of the second queues for each VLAN;
- a second scheduler taking out the frame taken out by the first scheduler by a weighted round-robin method; and
- a third scheduler outputting the frames queued in the first queues in an order of the higher priorities in preference to the frame selected by the second scheduler.

13. The relaying L2 switch as claimed in claim 11, further comprising:
- a VLAN functional portion mapping a frame to a predetermined VLAN;
- a frame classifying portion, assuming the tag be made a second tag, assigning to the frame a first tag indicating a priority preset with respect to the frame; and
- a policing portion comparing a detected transmission rate of the frame with a preset transmission rate, and assigning to the frame the second tag indicating whether or not the frame can be discarded.

14. The relaying L2 switch as claimed in claim 11, further comprising:
- a VLAN tag assigning portion assigning a VLAN tag to the received frame;
- a frame classifying portion, assuming the tag be made a second tag, assigning to the frame a first tag indicating a priority preset with respect to the frame; and
- a policing portion comparing a detected transmission rate of the frame with a preset transmission rate, and assigning to the frame the second tag indicating whether or not the frame can be discarded; a switch fabric switching the frame; and
- a VLAN tag deleting portion deleting the tags assigned to the frame from the switch fabric.

15. The relaying L2 switch as claimed in claim 11, wherein the shaper comprises a congested frame discarding portion discarding, based on the second tag, the frame having congested and queued in the queue.

16. An egress L2 switch comprising:
- a port receiving a frame; and
- a shaper discarding the frame having congested based on a tag indicating whether or not the frame is discardable, wherein the shaper, assuming the tag be made a second tag, includes:
  - a first queue queuing the frame based on a first tag indicating a priority assigned to the frame for each VLAN, and corresponding to the priority;
  - a first scheduler taking out the queued frame based on the priority of the queue for each VLAN; and
  - a second scheduler taking out the frame taken out by the first scheduler by a weighted round-robin method.

17. The egress L2 switch as claimed in claim 16, wherein the shaper comprises a congested frame discarding portion discarding, based on the second tag, the frame having congested and queued in the queue.

18. The egress L2 switch as claimed in claim 16, wherein the shaper, assuming the tag be made a second tag, comprises:
- M units of first queues, where M is a natural number, queuing frames with top M higher priorities based on the first tag which indicates a priority added to the frame;
- N units of second queues, where N is a natural number, queuing frames with lower priorities lower than the higher priorities based on the first tag for each VLAN;
- a first scheduler taking out the queued frame based on the priorities of the second queues for each VLAN; a second scheduler taking out the frame taken out by the first scheduler by a weighted round-robin method; and
- a third scheduler outputting the frames queued in the first queues in an order of the higher priorities in preference to the frame selected by the second scheduler.

19. The egress L2 switch as claimed in claim 16, further comprising a VLAN tag deleting portion deleting a VLAN tag assigned to the frame.

20. The egress L2 switch as claimed in claim 16, further comprising:

a VLAN functional portion mapping a frame to a predetermined VLAN;
a frame classifying portion, assuming the tag be made a second tag, assigning to the frame a first tag indicating a priority preset with respect to the frame; and
a policing portion comparing a detected transmission rate of the frame with a preset transmission rate, and
assigning to the frame the second tag indicating whether or not the frame can be discarded.

21. The egress L2 switch as claimed in claim 16, further comprising:
a VLAN tag assigning portion assigning a VLAN tag to the received frame;
a frame classifying portion, assuming the tag be made a second tag, assigning to the frame a first tag indicating a priority preset with respect to the frame; and
a policing portion comparing a detected transmission rate of the frame with a preset transmission rate, and
assigning to the frame the second tag indicating whether or not the frame can be discarded;
a switch fabric switching the frame; and
a VLAN tag deleting portion deleting the tags assigned to the frame from the switch fabric.

22. The egress L2 switch as claimed in claim 16, further comprising an OAM monitor monitoring a VLAN maintenance operation per VLAN.

23. The egress L2 switch as claimed in claim 22, further comprising a link down transferring portion sending a frame indicating a link down transfer per VLAN when the OAM monitor detects a link disconnection.

24. The egress L2 switch as claimed in claim 23, further comprising a valid/invalid setting portion setting whether or not the link down transferring portion should send a frame indicating the link down transfer.

* * * * *